(12) United States Patent
Schroeder et al.

(10) Patent No.: US 11,504,881 B2
(45) Date of Patent: Nov. 22, 2022

(54) CUTTING SECTION FOR A DRILL BIT

(71) Applicant: Hilti Aktiengesellschaft, Schaan (LI)

(72) Inventors: Florian Schroeder, Maienfeld (CH);
Guenter Domani, Weissensberg (DE);
Pingyan Rong, Feldkirch (AT)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 16/954,397

(22) PCT Filed: Dec. 11, 2018

(86) PCT No.: PCT/EP2018/084291
§ 371 (c)(1),
(2) Date: Jun. 16, 2020

(87) PCT Pub. No.: WO2019/121141
PCT Pub. Date: Jun. 27, 2019

(65) Prior Publication Data
US 2021/0107070 A1    Apr. 15, 2021

(30) Foreign Application Priority Data

Dec. 21, 2017   (EP) .................................. 17209642

(51) Int. Cl.
B23B 51/04     (2006.01)
B28D 1/04      (2006.01)
(52) U.S. Cl.
CPC .......... *B28D 1/041* (2013.01); *B23B 51/0466* (2013.01); *B23B 2251/50* (2013.01); *B23B 2265/32* (2013.01)

(58) Field of Classification Search
CPC ............ B23B 51/0466; B23B 2251/50; B23B 2265/32; B23B 51/0406; B23B 2240/04; B23B 2251/02; B28D 1/041
See application file for complete search history.

(56) References Cited

U.S. PATENT DOCUMENTS

| 5,980,168 A | * | 11/1999 | Tsypin | .................. B28D 1/041 |
| | | | | 175/20 |
| 2005/0105981 A1 | * | 5/2005 | Byrley | ................ B23B 51/0406 |
| | | | | 408/204 |
| 2015/0343539 A1 | | 12/2015 | Hoop | |

FOREIGN PATENT DOCUMENTS

| DE | 19810713 A1 | 9/1999 |
| DE | 20306797 U1 | 8/2003 |
| | (Continued) | |

OTHER PUBLICATIONS

International Search Report of PCT/EP2018/084291, dated Feb. 12, 2019.

*Primary Examiner* — Eric A. Gates
*Assistant Examiner* — Paul M Janeski
(74) *Attorney, Agent, or Firm* — Davidson, Davidson & Kappel, LLC

(57) ABSTRACT

A cutting section (11) which is connectable to a drill shaft section via a releasable connecting device. The cutting section includes a first open tubular element (14) which is in the form of a first hollow cylinder having a first waved, trapezoidal or zigzag-shaped cross-sectional area, a second closed tubular element (15) which is in the form of a second hollow cylinder having a circular ring-shaped cross-sectional area, and one or more drill segments (16) which are connected to the first open tubular element (14) and to the second closed tubular element (15).

19 Claims, 4 Drawing Sheets

(56) References Cited

FOREIGN PATENT DOCUMENTS

| | | | | |
|---|---|---|---|---|
| DE | 10321863 A1 | 12/2004 | | |
| EP | 0480263 A1 * | 4/1992 | ........... | E21B 10/605 |
| EP | 2886230 A1 * | 6/2015 | ......... | B23B 51/0473 |
| GB | 191405302 A | 12/1914 | | |
| GB | 1583860 A | 2/1981 | | |
| JP | 01177926 A * | 7/1989 | ............ | B28D 1/041 |
| JP | 2002120218 A * | 4/2002 | | |
| WO | WO 2014/096359 A1 | 6/2014 | | |
| WO | WO 2017/108461 A1 | 7/2014 | | |

\* cited by examiner

CUTTING SECTION FOR A DRILL BIT

TECHNICAL FIELD

The present invention relates to a cutting section for a drill bit wherein the cutting section is connectable to the drill bit via a releasable connection.

BACKGROUND

The design described in WO 2014/096359 A1 has become established as the design for cutting sections which are connectable to a drill shaft section via a releasable connecting device. The cutting section comprises one or more drill segments, a ring section, an outer push element and an annular stop shoulder at the transition from the ring section to the outer push element; the releasable connecting device is in the form of a combined push and twist connection. The cutting section comprises slot-shaped recesses of T shape which are arranged in the outer push element.

During the drilling of substrates composed of reinforced concrete, the problem of jammed drill bits occurs. A cause of the jamming of the drill bit can be an iron wedge which is severed on the inner side of the cutting section and wedges in the inner gap between the drill core and the cutting section. It is known from WO 2017/108461 A1 that, in the case of drill bits having a small internal projection of the drill segments in relation to the drill shaft, the risk of the cutting section of a drill bit becoming jammed in the substrate is reduced. However, a small internal projection of the drill segments leads to a narrow inner gap on the inner side of the drill bit and therefore to disadvantages during the wet drilling with the drill bit. During the wet drilling, a cooling and flushing liquid is required which, as cooling liquid, cools the drill segments and, as flushing liquid, transports drilling debris out of the drill hole. The clean cooling and flushing liquid is supplied via the inner gap between the drill core and the drill bit. Cooling and flushing liquid cannot be sufficiently transported to the machining site via the narrow inner gap.

As measures for improving the supply of the cooling and flushing liquid in the case of drill bits having a small internal projection of the drill segments, WO 2017/108461 A1 describes the use of transport channels on the inner side of the drill shaft or the use of drill shafts having a waved, trapezoidal or zigzag-shaped cross-sectional area.

In the case of drill bits having a releasable cutting section, transport channels can improve the supply of liquid. It is disadvantageous to replace the cutting section which is known from WO 2014/096359 A1 and has a circular ring-shaped cross-sectional area by a cutting section having a waved, trapezoidal or zigzag-shaped cross-sectional area.

SUMMARY OF THE INVENTION

An object of the present invention is to further develop a cutting section for a drill bit to the effect that the risk of the cutting section becoming wedged in the substrate during drilling in reinforced concrete is reduced. In addition or alternately, the manufacturing outlay for the production of a cutting section is intended to be reduced.

The cutting section is provided for a drill bit and is designed to be connectable to a drill shaft section of the drill bit via a releasable connecting device. The cutting section is characterized by:
a first open tubular element which is in the form of a first hollow cylinder having a first waved, trapezoidal or zigzag-shaped cross-sectional area and which has a first hollow cylinder height, a first inside diameter and a first outside diameter,
a second closed tubular element which is in the form of a second hollow cylinder having a second circular ring-shaped cross-sectional area and which has a second hollow cylinder height, a second inside diameter and a second outside diameter, wherein the first outside diameter is smaller than the second inside diameter, and
one or more drill segments,
wherein the first open tubular element is pushed into the second closed tubular element, and the one or the more drill segments are connected to the first open tubular element and to the second closed tubular element.

The cutting section according to the invention comprises a first open tubular element, a second closed tubular element and at least one drill segment. The first open tubular element is in the form of a first hollow cylinder having a first waved, trapezoidal or zigzag-shaped cross-sectional area and comprises a first outer lateral surface, a first inner lateral surface, a first lower end surface and a first upper end surface. The second closed tubular element is in the form of a second hollow cylinder having a second circular ring-shaped cross-sectional area and comprises a second outer lateral surface, a second inner lateral surface, a second lower end surface and a second upper end surface.

In order to manufacture the cutting section, the first open tubular element and the second closed tubular element are pushed one into the other and the one or the more drill segments are connected to the first open tubular element and to the second closed tubular element. In respect of the stability of the cutting section, it is advantageous if the drill segments are connected to the first open tubular element and to the second closed tubular element. The drill segments can be welded, soldered or screwed to the first open tubular element and to the second closed tubular element or connected thereto using another suitable type of fastening.

By separation of the cutting section into the first tubular element and the second tubular element, an adaptation of the cutting section to the different demands made with regard to transmission of force, transmission of torque and stability in relation to tensile loadings during the removal of a jammed drill bit can be taken into consideration. The cutting section is designed in such a manner that force is transmitted from a drill shaft section via the first tubular element to the drill segments and torque is transmitted from the drill shaft section via the second tubular element to the drill segments. The first upper end surface of the first tubular element forms an annular stop shoulder which is used for transmitting force. The drill shaft section transmits the force to the annular stop shoulder by means of an annular end surface. Torque is transmitted, for example, via pin elements of the drill shaft section which interact with slot-shaped recesses in the second tubular element. By separation of the cutting section into the first open tubular element and the second closed tubular element, the different demands made of the cutting section in respect of transmission of force and transmission of torque can be taken into consideration.

In addition, by separation of the cutting section into the first open tubular element and the second closed tubular element, the manufacturing outlay for producing the cutting section can be reduced. The first upper end surface forms the annular stop shoulder for transmitting force, thus obviating the need for turning. The first tubular element and the second tubular element are in the form of hollow cylinders and have constant material thicknesses. The first tubular element can be produced from a first profiled metal sheet which is formed into a first open tubular element and is connected at first abutting edges in an integrally bonded or form fitting manner. The second tubular element can be produced from a second flat sheet metal part which is formed into a second open tubular element and is connected at second abutting edges in an integrally bonded or form fitting manner.

The first open tubular element has the advantage that the first outer lateral surface of the first open tubular element is in contact with the second inner lateral surface of the second open tubular element. If the first outer lateral surface and the second inner lateral surface are in contact, the drill segments can be connected to the first open tubular element and to the second closed tubular element by a weld seam.

The first tubular element which is in the form of a first hollow cylinder having a first waved, trapezoidal or zigzag-shaped cross-sectional area permits the design of a cutting section without an internal projection or with a small internal projection of the drill segments on the inner side of the cutting section since the cooling and flushing liquid can be transported in the required quantity to the machining site via the depressions.

The first lower end surface of the first open tubular element and the second lower end surface of the second closed tubular element are preferably aligned flush. The flush alignment of the first lower end surface and the second lower end surface has the advantage that a wide attachment surface for the drill segments arises, at which the drill segments can be connected to the first open tubular element and to the second closed tubular element.

The one or the more drill segments are particularly preferably connected to the first lower end surface and to the second lower end surface. The flush alignment of the first lower end surface and the second lower end surface gives rise to a wide attachment surface for the drill segments. If the drill segments are connected to the first lower end surface and to the second lower end surface, the first open tubular element and the second closed tubular element can be connected to each other simultaneously. If the drill segments are connected to the first open tubular element and to the second closed tubular element simultaneously, the manufacturing outlay can be reduced. Depending on the material thicknesses used, it may be necessary for the first open tubular element and the second closed tubular element to be additionally connected to each other. Should higher resistance torques be required, the first open tubular element and the second closed tubular element may be additionally connected to each other.

The second closed tubular element preferably has at least one slot-shaped recess, wherein the at least one slot-shaped recess comprises a transverse slot and a connecting slot, and the connecting slot connects the transverse slot to the second upper end surface of the second closed tubular element. The at least one slot-shaped recess is part of the releasable connecting device which connects the cutting section to a drill shaft section of the drill bit. The slot-shaped recess is T-shaped or L-shaped and, in the connected state of the drill bit, permits a relative movement between the cutting section and the drill shaft section. The relative movement between the cutting section and the drill shaft section enables a jammed cutting section to be released from the substrate.

The second closed tubular element in the second inner lateral surface particularly preferably has at least one transverse groove which is arranged level with the connecting slot of the at least one slot-shaped recess. The at least one transverse groove is part of the releasable connecting device which connects the cutting section to a drill shaft section of the drill bit. The width of the transverse groove is greater than or equal to the width of the transverse slot of the slot-shaped recess. A matching transverse lug of a drill shaft section engages in the transverse groove of the cutting section. The transverse groove and transverse lug form an additional form fitting connection which prevents the push and twist connection from being unintentionally opened during release of a jammed drill bit and the drill shaft section from being removed from the substrate without the cutting section.

In a preferred development, the first open tubular element is formed from a first material and the second closed tubular element from a second material. The cutting section according to the invention is designed in such a manner that force is transmitted to the cutting section via the first tubular element and torque is transmitted to the cutting section via the second tubular element. By separation of the cutting section into the first tubular element and the second tubular element, the choice of the first material and of the second material can be adapted to the different demands made of the cutting section in respect of transmission of force and transmission of torque. In addition, the second material can be adapted in respect of tensile loadings during the removal of a jammed drill bit.

The first open tubular element is preferably in the form of a first formed sheet metal part. The use of a first formed sheet metal part permits the production of the first open tubular element from profiled metal sheets. The first open tubular element can be produced from a first profiled metal sheet which is formed into a first open tubular element. Cold forming methods and hot forming methods are suitable as the forming method for the first sheet metal part.

The second closed tubular element is preferably in the form of a second formed sheet metal part. The use of a second formed sheet metal part permits the production of the second closed tubular element from flat sheet metal parts. The second closed tubular element can be produced from a second sheet metal part which is formed into a second open tubular element and is connected at the second abutting edges. The at least one slot-shaped recess can be produced in the second sheet metal part, for example, by punching or cutting out. Cold forming methods and hot forming methods are suitable as the forming method for the second sheet metal part. The second abutting edges can be connected in an integrally bonded or form fitting manner, with the abutting edges of tubular elements conventionally being connected in an integrally bonded manner by welding. In addition to the integrally bonded connection, the second abutting edges can be connected in a form fitting manner.

The second formed sheet metal part particularly preferably has at least one second positive form fitting element and at least one corresponding second negative form fitting element on opposite sides, wherein the at least one second positive form fitting element and the at least one second negative form fitting element are connected in a form fitting manner in the second closed tubular element. The connection of the second abutting edges via second form fitting elements has the advantage that heat which may lead to stresses in the second closed tubular element is not admitted into the second open tubular element.

The cutting section according to the invention for a drill bit is provided for connection to a drill shaft section of the drill bit. The invention furthermore relates to a drill bit with a cutting section and a drill shaft section, wherein the cutting section and the drill shaft section are connectable via a releasable connecting device.

BRIEF DESCRIPTION OF THE DRAWINGS

Exemplary embodiments of the invention are described hereinafter with reference to the drawing. It is not necessarily intended for this to illustrate the exemplary embodiments to scale; instead, the drawing, where conducive to elucidation, is produced in schematic and/or slightly distorted form. It should be taken into account here that various modifications and alterations relating to the form and detail of an embodiment may be undertaken without departing from the general concept of the invention. The general concept of the invention is not limited to the exact form or the detail of the preferred embodiment shown and described hereinafter or limited to subject matter that would be limited compared to the subject matter claimed in the claims. For given design ranges, values within the limits mentioned will also be disclosed as limit values and will be usable and claimable as desired. For the sake of simplicity, identical reference signs are used hereinafter for identical or similar parts or parts having identical or similar function.

In the drawing.

DETAILED DESCRIPTION

Figure 1A:
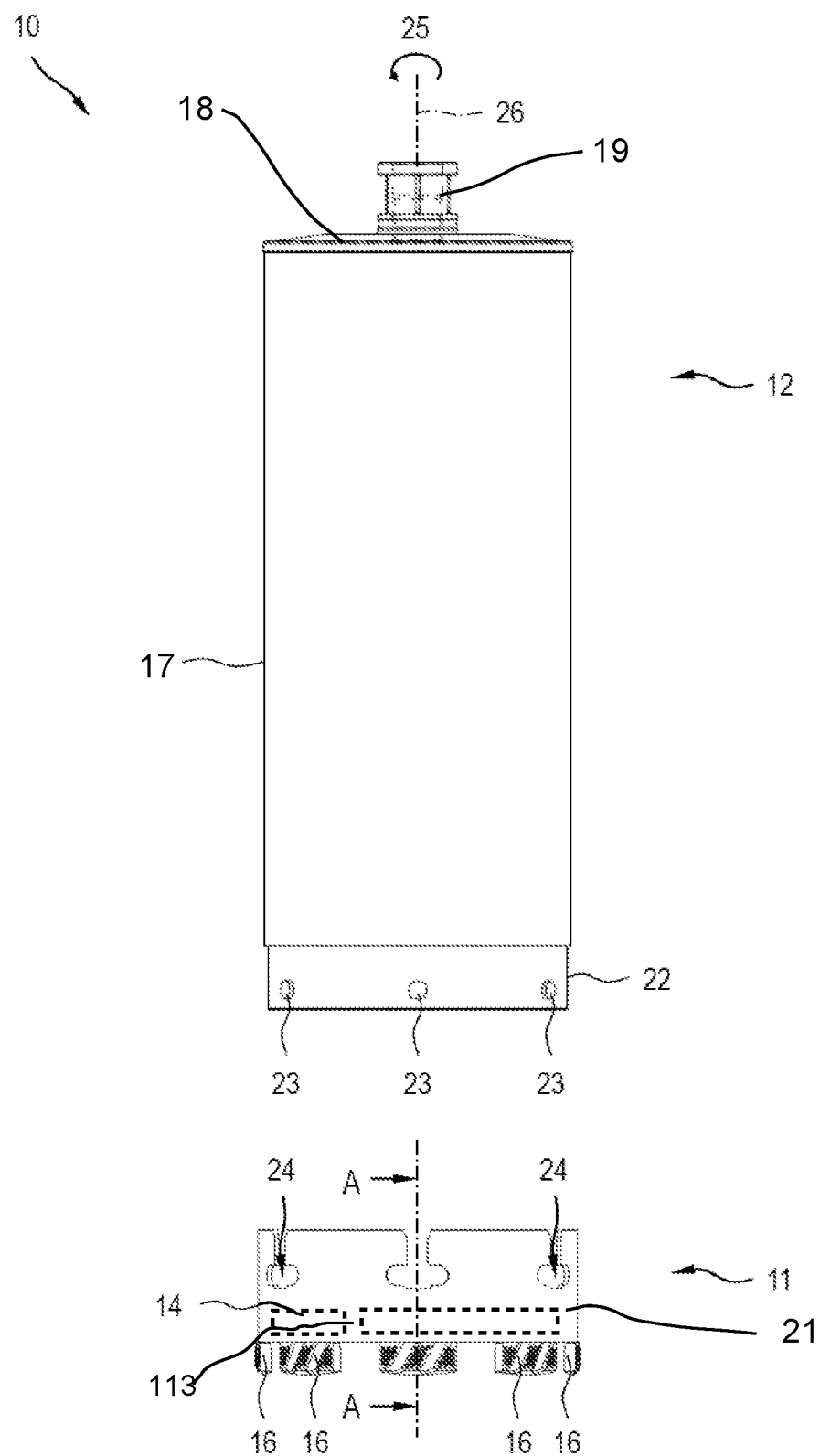
FIGS. 1A and 1B show a drill bit with a cutting section according to the invention and a drill shaft section, which are connectable via a releasable connecting device, in an unconnected state of the drill bit (FIG. 1A) and in a connected state of the drill bit (FIG. 1B)
Figure 1B:
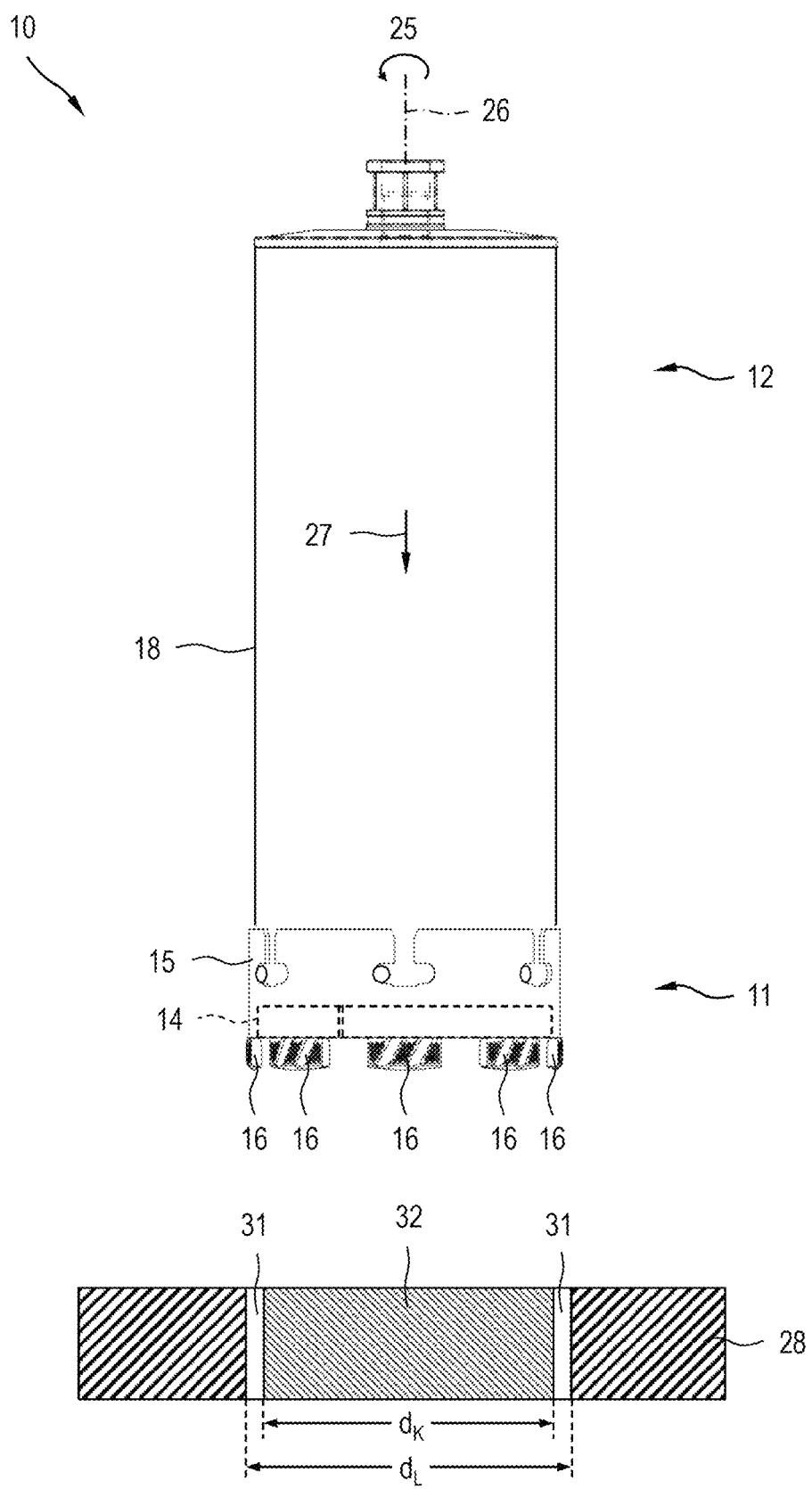

FIGS. 1A and 1B show a drill bit 10 which comprises a cutting section 11 according to the invention and a drill shaft section 12, wherein the cutting section 11 and the drill shaft section 12 are connectable via a releasable connecting device 13. In this case, FIG. 1A shows the cutting section 11 and drill shaft section 12 in an unconnected state of the drill bit, and FIG. 1B shows the cutting section 11 and drill shaft section 12 in a connected state of the drill bit.

The cutting section 11 comprises a first open tubular element 14, a second closed tubular element 15 and a plurality of drill segments 16 which are connected to the first closed tubular element 14. The drill segments 16 are arranged annularly and form a drill ring with intermediate spaces. Instead of a plurality of drill segments 16, the cutting section 11 can also have an individual drill segment which is in the form of a closed drill ring. The drill segments 16 are welded, soldered or screwed to the first open tubular element 14 and to the second closed tubular element 15 or fastened to the first closed tubular element 14 using another suitable type of fastening. The drill shaft section 12 comprises a tubular drill shaft 17, a cover 18 and a shank 19 via which the drill bit 10 is fastened in a tool fitting of a core drill. The first open tubular element 14 is not fixedly connected at edges 113 (shown schematically) and thus open.

The releasable connecting device 13 is in the form of a combined push and twist connection, as disclosed in WO 2014/096359 A1. The releasable connecting device 13 comprises a first push element 21 which is integrated in the cutting section 11, and a second push element 22 which is integrated in the drill shaft section 12. The first and second push elements 21, 22 form a push connection and are additionally secured via a twist connection. The twist connection comprises a plurality of pin elements 23 which are introduced into slot-shaped recesses 24. The pin elements 23 are fastened to an outer side of the second push element 22, and the slot-shaped recesses 24 are provided in the first push element 21. The cutting section 11 can be connected simply and rapidly to the drill shaft section 12 by the operator. For this purpose, the cutting section 11 with the first push element 21 is pushed onto the second push element 22 of the drill shaft section 12 in such a manner that the pin elements 23 are arranged in the slot-shaped recesses 24.

In the drilling mode, the drill bit 10 is driven by a core drill in one direction of rotation 25 about an axis of rotation 26, wherein the axis of rotation 26 coincides with a longitudinal axis of the tubular drill shaft 17. During the rotation of the drill bit 10 about the axis of rotation 26, the drill bit 10 is moved in a feed direction 27 into a workpiece 28, with the feed direction 27 running parallel to the axis of rotation 26. In the workpiece 28, the drill bit 10 produces a drill hole 31 with a drill hole diameter $d_L$ and a drill core 32 with a core diameter $d_K$. The drill segments 15 form a drill ring with an outside diameter which corresponds to the drill hole diameter $d_L$ and with an inside diameter which corresponds to the core diameter $d_K$.

Figure 2A:
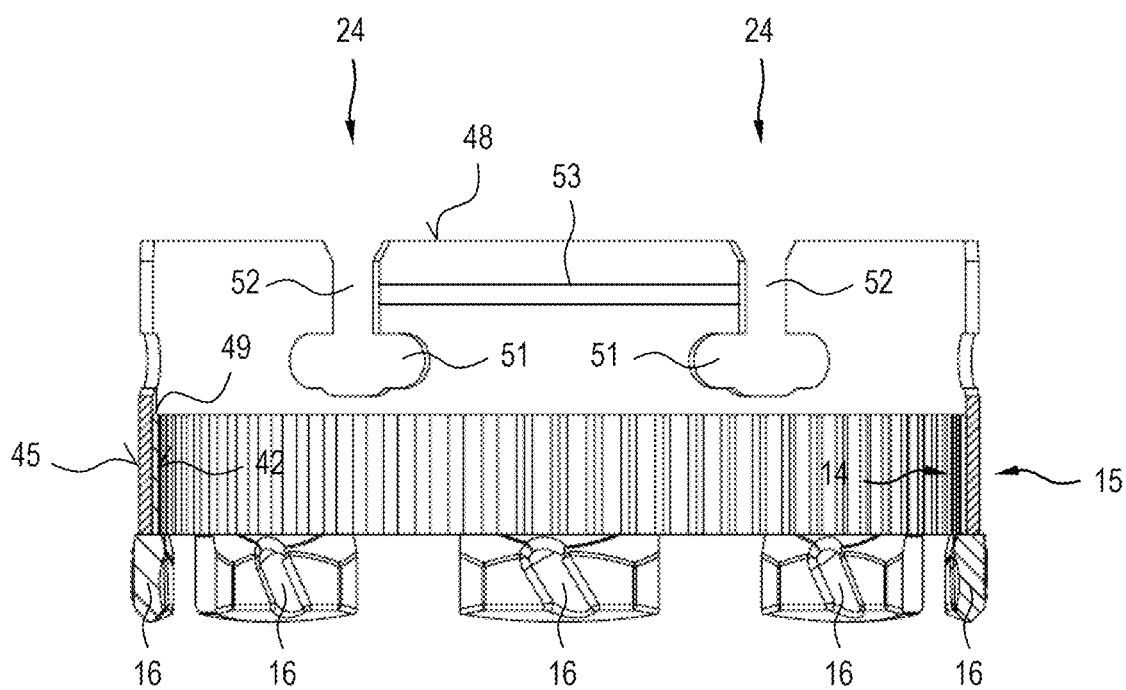
FIGS. 2A, 2B and 2C show the cutting section according to the invention of FIG. 1 consisting of a first open tubular element, a second closed tubular element and a plurality of drill segments (FIG. 2A showing all and FIG. 2B showing the first open tubular element and FIG. 2C the second closed tubular element) in a longitudinal section along the section line A-A in FIG. 1A.
Figure 2B:
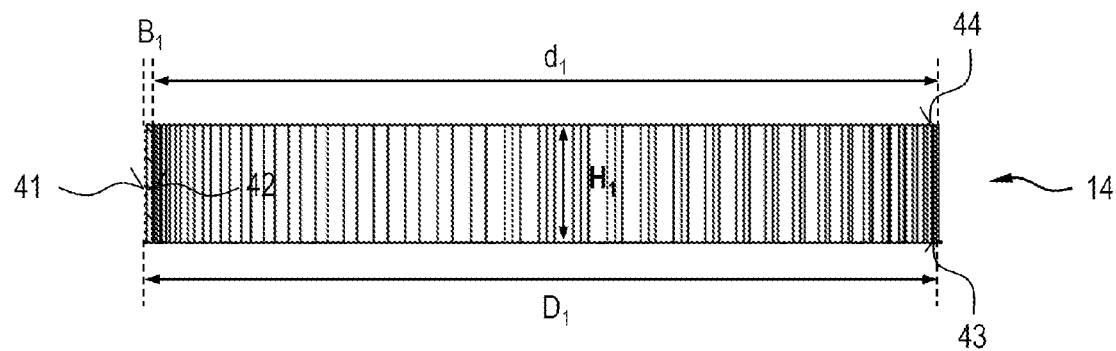
Figure 2C:
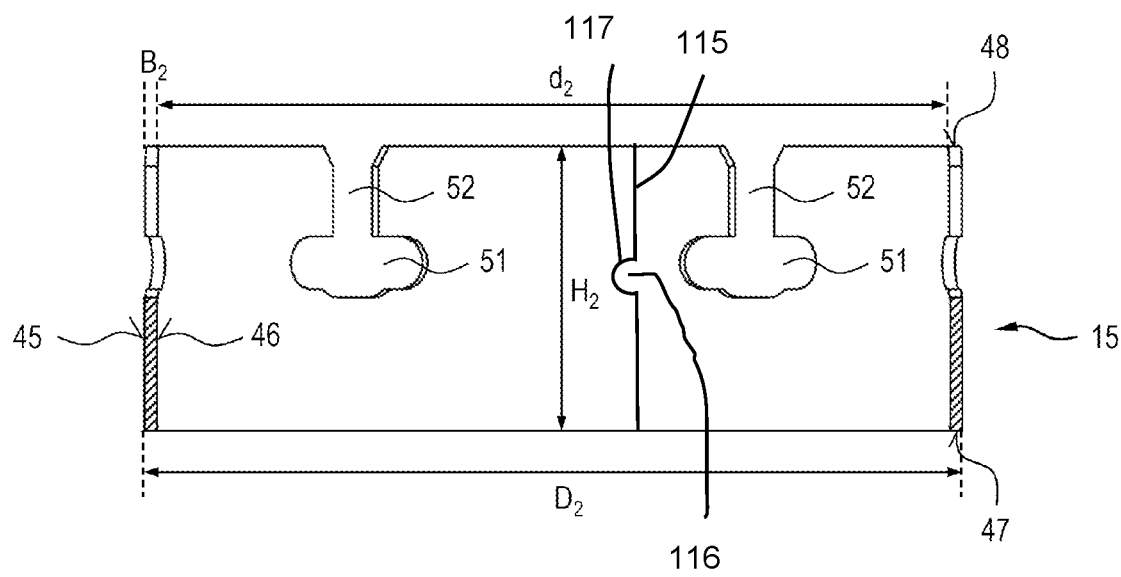

FIGS. 2A, 2B and 2C show the cutting section 11 according to the invention of FIG. 1 with the first open tubular element 14, the second closed tubular element 15 and the drill segments 16 in a longitudinal section along the section line A-A in FIG. 1A. FIG. 2B shows the first open tubular element 14 and FIG. 2C shows the second closed tubular element 15 of the cutting section 11.

The cutting section 11 is produced from the first open tubular element 14, the second closed tubular element 15 and the drill segments 16. The drill segments 16 are connected to the first open tubular element 14 and to the second closed tubular element 15. The drill segments 16 can be welded, soldered or screwed to the first open tubular element 14 and to the second closed tubular element 14, 15 or fastened thereto using another suitable type of fastening.

As shown in FIG. 2B, the first open tubular element 14 is in the form of a first hollow cylinder having a first waved cross-sectional area; alternatively to the waved cross-sectional area, trapezoidal or zigzag-shaped cross-sectional areas can be used. The first open tubular element 14 comprises a first outer lateral surface 41, a first inner lateral surface 42, a first lower end surface 43 and a first upper end surface 44. The dimensions of the first open tubular element 14 are defined by a first hollow cylinder height $H_1$, a first inside diameter $d_1$ and a first outside diameter $D_1$. The width of the first open tubular element 14 is produced as half the difference of the first outside diameter $D_1$ and the first inside diameter $d_1$ and is referred to as the first width $B_1$. The diameter of an inner circle is defined as the first inside diameter $d_1$ and the diameter of an outer circle is defined as the first outside diameter $D_1$.

As shown in FIG. 2C, the second closed tubular element 15 is in the form of a second hollow cylinder having a circular ring-shaped cross-sectional area. The second closed tubular element 15 comprises a second outer lateral surface 45, a second inner lateral surface 46, a second lower end surface 47 and a second upper end surface 48. The dimensions of the second closed tubular element 15 are defined by a second hollow cylinder height $H_2$, a second inside diameter $d_2$ and a second outside diameter $D_2$. The width of the second closed tubular element 15 is produced as half the difference of the second outside diameter $D_2$ and the second inside diameter $d_2$ and is referred to as the second width $B_2$. As shown schematically, the second closed tubular element 15 can be connected at second abutting edges 115 in an interlocking manner with a second positive interlocking element 116 and a second negative interlocking element 117.

The first lower end surface 43 of the first open tubular element 14 and the second lower end surface 47 of the second closed tubular element 15 are preferably aligned flush. The flush alignment of the first lower end surface 43 and the second lower end surface 47 has the advantage that a wide attachment surface for the drill segments 16 arises, at which the drill segments 16 can be connected to the first open tubular element 14 and to the second closed tubular element 15. If the drill segments 16 are connected to the first lower end surface 43 and to the second lower end surface 47, the first open tubular element 14 and the second closed tubular element 15 can be connected to each other simultaneously. Depending on the material thicknesses used, it may be necessary for the first open tubular element 14 and the second closed tubular element 15 to be additionally connected to each other.

The cutting section 11 is designed in such a manner that force is transmitted from the drill shaft section 12 to the cutting section 11 via the first tubular element 14 and torque is transmitted from the drill shaft section 12 to the cutting section 11 via the second tubular element 15. The first upper end surface 44 of the first tubular element 14 forms an annular stop shoulder 49 on the inner side of the cutting section 11 for the transmission of force of a connected drill shaft section. Torque is transmitted from the drill shaft section 12 to the cutting section 11 via the pin elements 23 and the slot-shaped recesses 24. The second closed tubular element 15 of the cutting section 11 has a plurality of slot-shaped recesses 24 on the second upper end surface 48. The slot-shaped recesses 24 each comprise a transverse slot 51 and a connecting slot 52, wherein the connecting slot 52 connects the transverse slot 51 to the second upper end surface 48.

The first tubular element 14 can be produced from a first material and the second tubular element 15 from a second material. By separation of the cutting section 11 into the first open tubular element 14 and the second closed tubular element 15, the choice of the first material and of the second material can be adapted to the different demands made of the first open tubular element 14 and of the second closed tubular element 15.

What is claimed is:

1. A cutting section for a drill bit, the cutting section being connectable to a drill shaft section of the drill bit via a releasable connection, the cutting section comprising:
   an open first tubular element in the form of a first hollow cylinder having a first waved, trapezoidal or zigzag-shaped cross-sectional area and having a first hollow cylinder height, a first inside diameter and a first outside diameter, the open first tubular element being open so that edges facing each other are not fixedly connected;
   a closed second tubular element in the form of a second hollow cylinder having a second circular ring-shaped cross-sectional area and having a second hollow cylinder height, a second inside diameter and a second outside diameter, wherein the first outside diameter is smaller than the second inside diameter; and
   at least one drill segment;
   the first tubular element being pushed into the second tubular element, and the at least one drill segment being connected to the open first tubular element and to the closed second tubular element.

2. The cutting section as recited in claim 1 wherein a first lower end surface of the open first tubular element and a second lower end surface of the a closed second tubular element are aligned flush.

3. The cutting section as recited in claim 2 wherein the at least one drill segment is connected to the first lower end surface and to the second lower end surface.

4. The cutting section as recited in claim 3 wherein the at least one drill segment include a plurality of drill segments spaced circumferentially apart from each other.

5. The cutting section as recited in claim 4 wherein the plurality of drill segments are welded to the first lower end surface and to the second lower end surface.

6. The cutting section as recited in claim 3 wherein the at least one drill segment is welded to the first lower end surface and to the second lower end surface.

7. The cutting section as recited in claim 2 wherein the plurality of drill segments are welded to the open first tubular element and the closed second tubular element.

8. The cutting section as recited in claim 1 wherein the closed second tubular element has at least one slot-shaped recess, the at least one slot-shaped recess having a transverse slot and a connecting slot, and the connecting slot connecting the transverse slot to the second upper end surface of the closed second tubular element.

9. The cutting section as recited in claim 8 wherein the closed second tubular element in the second inner lateral surface has at least one transverse groove arranged level with the connecting slot of the at least one slot-shaped recess.

10. The cutting section as recited in claim 1 wherein the open first tubular element is formed from a first material and the closed second tubular element from a second material.

11. The cutting section as recited in claim 1 wherein the open first tubular element is in the form of a formed sheet metal part.

12. The cutting section as recited in claim 1 wherein the closed second tubular element is in the form of a formed sheet metal part.

13. The cutting section as recited in claim 12 wherein the second formed sheet metal part has at least one second positive form fitting element and at least one corresponding second negative form fitting element on opposite sides, wherein the at least one second positive form fitting element and the at least one second negative form fitting element are connected in a form fitting manner in the closed second tubular element.

14. A drill bit comprising:
   the cutting section as recited in claim 1; and
   the drill shaft section, the cutting section and the drill shaft section being connectable via the releasable connection.

15. The cutting section as recited in claim 1 wherein the first hollow cylinder has the waved cross sectional area.

16. The cutting section as recited in claim 1 wherein the open first tubular element is made of a material different from the closed second tubular element.

17. The cutting section as recited in claim 1 wherein the open first tubular element and the closed second tubular element are fixed to each other only by the at least one drill segment.

18. The cutting section as recited in claim 1 wherein the at least one drill segment include a plurality of drill segments spaced circumferentially apart from each other.

19. The cutting section as recited in claim 1 wherein the at least one drill segment is welded to the open first tubular element and the closed second tubular element.

* * * * *